United States Patent
Mizell et al.

(10) Patent No.: US 9,567,759 B2
(45) Date of Patent: **\*Feb. 14, 2017**

(54) AUTOMATIC LOCKING DEVICE FOR TRACK MOUNTED GANGWAY

(71) Applicant: Sam Carbis Asset Management, LLC, Florence, SC (US)

(72) Inventors: Shawn Cramer Mizell, Florence, SC (US); Anthony Jay Cook, Florence, SC (US)

(73) Assignee: Sam Carbis Asset Management, LLC, Florence, SC (US)

(*) Notice: Subject to any disclaimer, the term of this patent is extended or adjusted under 35 U.S.C. 154(b) by 609 days.

This patent is subject to a terminal disclaimer.

(21) Appl. No.: 13/911,420

(22) Filed: Jun. 6, 2013

(65) Prior Publication Data

US 2014/0360812 A1    Dec. 11, 2014
US 2016/0177582 A9    Jun. 23, 2016

Related U.S. Application Data

(63) Continuation of application No. 12/860,481, filed on Aug. 20, 2010, now Pat. No. 8,479,884.

(51) Int. Cl.
*B66F 11/04* (2006.01)
*B60P 1/00* (2006.01)
*E04G 3/00* (2006.01)

(52) U.S. Cl.
CPC . *E04G 3/00* (2013.01); *B60P 1/00* (2013.01); *B66F 11/044* (2013.01); *Y10T 403/608* (2015.01)

(58) Field of Classification Search
CPC .............. B66F 11/04; E04G 3/00; B60P 1/00; Y10T 403/608
USPC ........ 182/112, 113, 141; 403/330, 326, 327; 292/1, 95, 121–123, 128, 129, 96, 97, 99, 292/101–103, 108, 194, 219, 220, 222, 292/223, 228, 229, 195, 196, 198, 292/202–204, 210
IPC ......................................................... B60P 1/00
See application file for complete search history.

(56) References Cited

U.S. PATENT DOCUMENTS

| | | | |
|---|---|---|---|
| 1,840,250 A | 1/1932 | Prescott | |
| 4,545,575 A * | 10/1985 | Forjot | A63B 69/18 104/91 |
| 5,042,612 A | 8/1991 | Bennett et al. | |
| 5,685,227 A * | 11/1997 | Gaccetta | B61B 3/00 104/250 |
| 6,390,152 B1 | 5/2002 | Donovan et al. | |
| 7,032,973 B2 * | 4/2006 | Reubeuze | 297/378.13 |
| 7,140,467 B2 | 11/2006 | Cook | |
| 7,216,741 B2 | 5/2007 | MacDonald et al. | |
| 7,484,461 B2 * | 2/2009 | Britcher | A63B 69/201 104/89 |
| 7,503,722 B2 * | 3/2009 | Chou | 403/325 |

(Continued)

FOREIGN PATENT DOCUMENTS

GB    1330371 A * 9/1973 ............... B61K 7/04

*Primary Examiner* — Daniel Cahn
(74) *Attorney, Agent, or Firm* — Amy Allen Hinson; Nexsen Pruet, LLC

(57) ABSTRACT

A locking device and apparatus is disclosed. The locking device is particularly suitable for use in combination with a device such as a track mounted gangway and safety cage to reduce the ability to reposition the gangway and safety cage along a track surface while in the lowered access position. The locking device preferably includes a lever assembly and a pivot assembly having a friction pad connected to the lever assembly. When the lever assembly and/or gangway device is adjusted in a first direction, the friction pad applies pressure on the track surface and moveability between the gangway and the track surface is reduced.

20 Claims, 9 Drawing Sheets

(56) References Cited

U.S. PATENT DOCUMENTS

| | | |
|---|---|---|
| 7,900,744 B2 | 3/2011 | McLaughlin et al. |
| 8,333,530 B2 * | 12/2012 | Omori .......................... 403/330 |
| 8,479,884 B2 * | 7/2013 | Mizell et al. ................. 182/141 |
| 2004/0238277 A1 | 12/2004 | Kruse |
| 2007/0256715 A1 * | 11/2007 | Oppel et al. ............. 134/57 DL |
| 2012/0042458 A1 * | 2/2012 | Bennett et al. ................ 14/71.3 |
| 2012/0045274 A1 * | 2/2012 | Mizell et al. ................. 403/330 |
| 2013/0327591 A1 * | 12/2013 | Galpin ............... A62B 35/0081 |
| | | 182/3 |

* cited by examiner

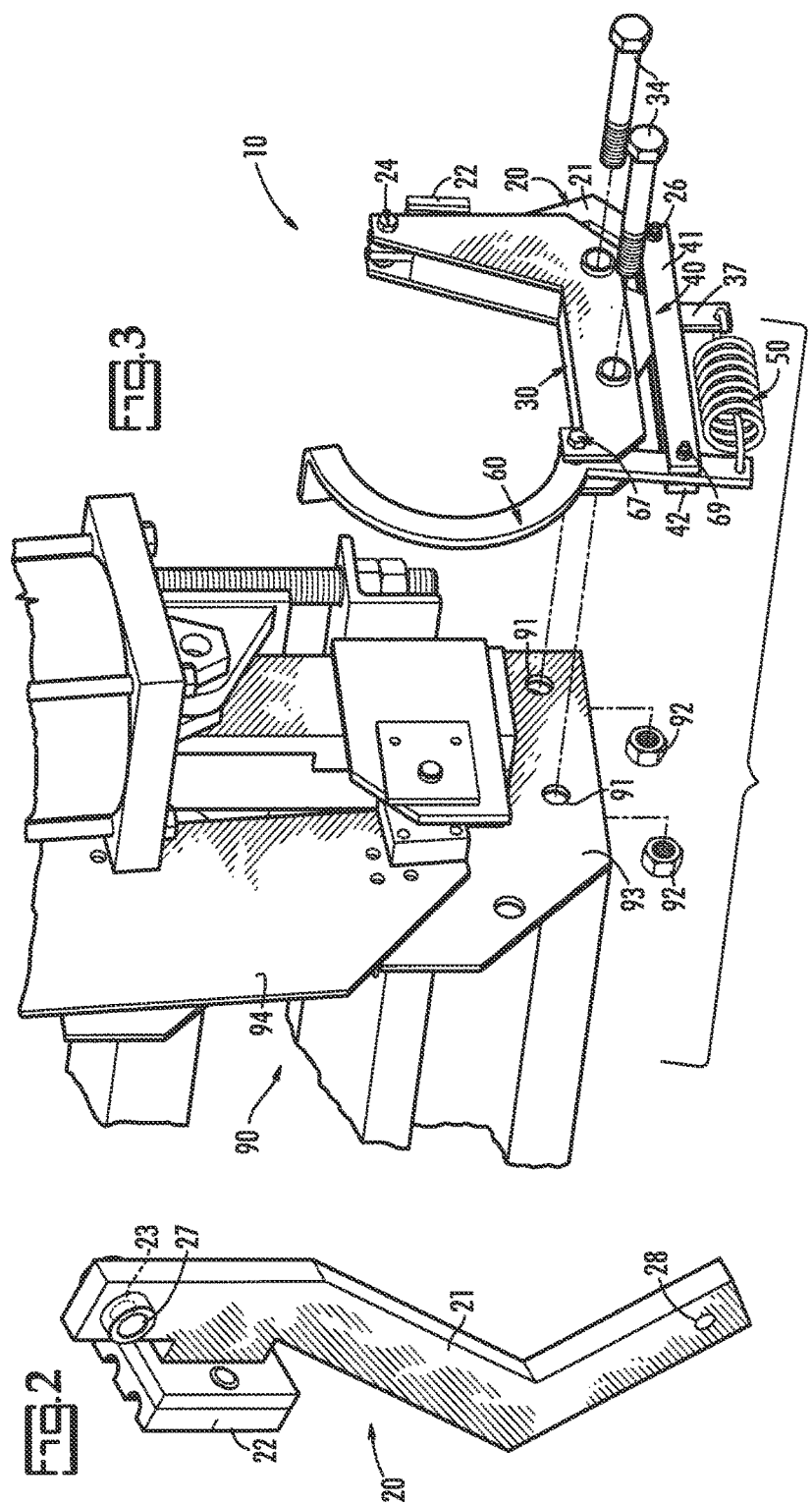

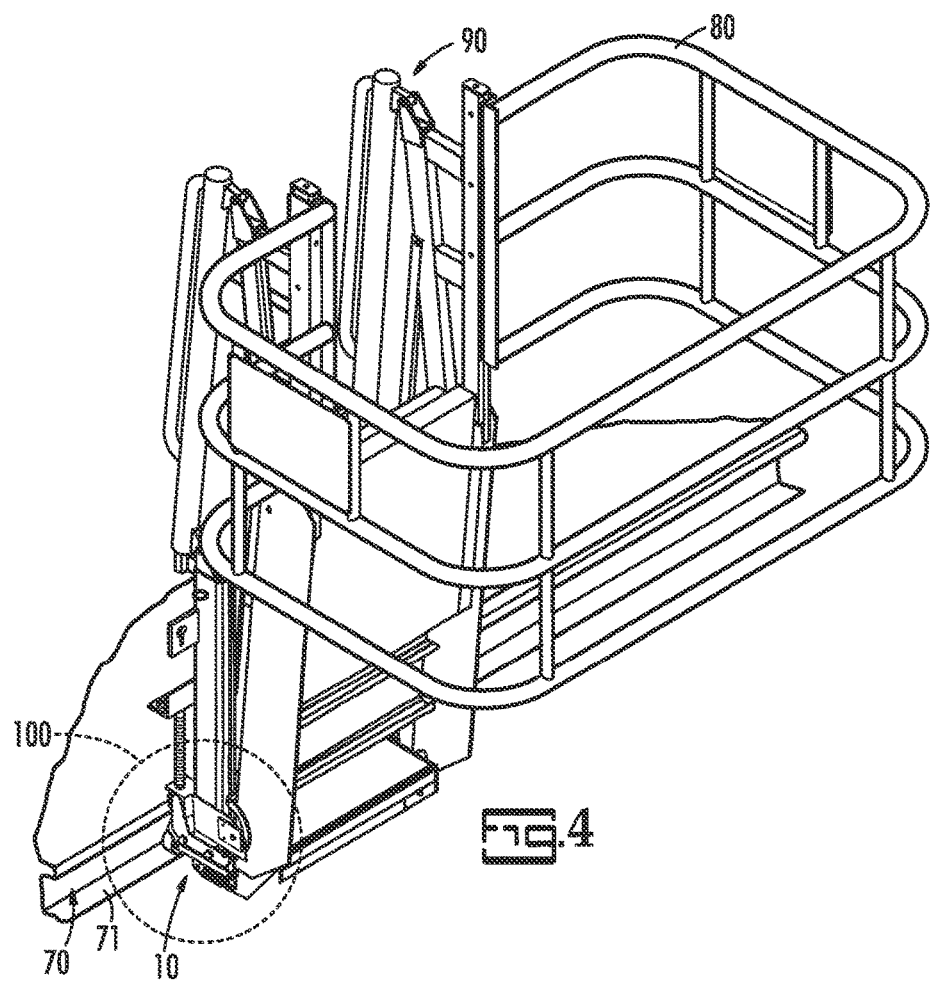

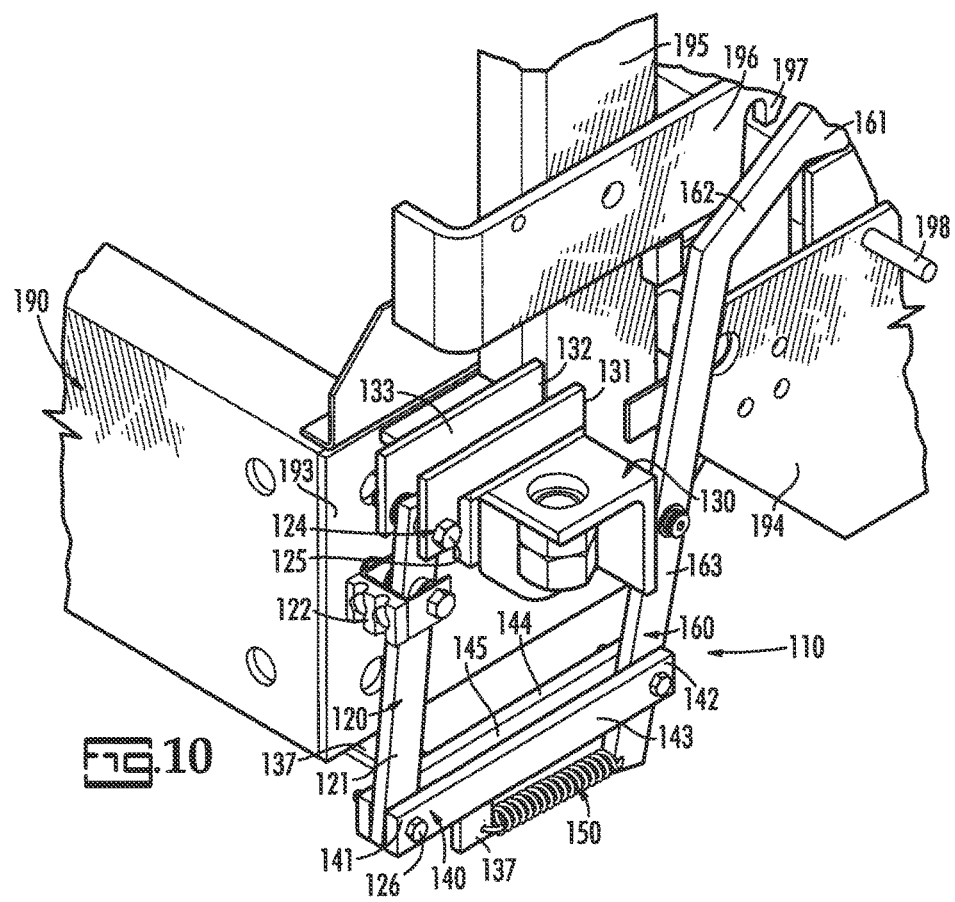

AUTOMATIC LOCKING DEVICE FOR TRACK MOUNTED GANGWAY

CROSS REFERENCE TO RELATED APPLICATION

The present application claims priority to pending U.S. patent application Ser. No. 12/860,481, filed Aug. 20, 2010, which is incorporated herein by reference in its entirety.

BACKGROUND

The present invention discloses a locking device and apparatus that is typically used for locking a device such as a gangway to a track surface. Frequently a gangway is used for providing access from a service platform to the upper surface of a mobile container such as a transport truck. Often these gangways are adjustable between a raised stored position and a lowered service position whereby the worker can gain access to the upper surface of the mobile container.

Walking on the upper surface of most mobile containers, however, is dangerous and the risk of falling or injury is quite high. Safety cages, such as the one disclosed in U.S. Pat. No. 7,216,741, are therefore typically attached to the end of gangways to reduce the risk of injury and falling. Typical safety cage designs, however, only allow for a limited amount of access to the upper surface of the vehicle, so to obtain safe access to a location outside of the safety cage, the gangway and safety cage must be repositioned. Preferred repositioning typically requires a worker to exit the safety cage and gangway, raise the gangway to the raised stored position, reposition the gangway to the new location, lower the gangway to the lowered service position, and then reenter the gangway and safety cage.

Workers, however, have found this method of repositioning tedious and therefore, frequently attempt to cut corners by pushing and/or pulling the gangway and safety cage to the sought after location. Pushing and/or pulling the gangway reduces the function of the gangway and safety cage, increases the risk of injury and falling, and often damages the upper surface of the mobile container and/or the gangway.

Thus there is a need in the art for an efficient and effective device that reduces a worker's ability to manually reposition the gangway and safety cage while on the upper surface of a mobile container.

SUMMARY

The present invention provides a locking apparatus. In one embodiment of the present invention, the apparatus includes a connecting link having a first end and a second end and a lever assembly pivotably attached to the first end of the connecting link. The apparatus also includes a pivot assembly having a friction pad. The pivot assembly is pivotably attached to the second end of the connecting link and is pivotably attached to a carriage assembly. The carriage assembly is adaptable for mounting to a device such as a gangway. A first end of a spring is attached to the lever assembly and a second end of the spring is adaptable for mounting to the device.

In an alternative embodiment of the locking apparatus of the present invention, the locking apparatus includes an access moveable along a track surface and a locking device mounted to the access. The locking device includes an adjustable lever assembly and a pivot assembly connected to the lever assembly. The pivot assembly includes a friction pad. When the lever assembly is adjusted in a first direction, the friction pad applies pressure on the track surface and moveability between the access and the track surface is reduced.

BRIEF DESCRIPTION OF THE DRAWINGS

FIG. 2 is a perspective view of a brake pad pivot assembly according to an embodiment of the present invention.

FIG. 3 is an exploded perspective view of a locking device attached to a gangway according to an embodiment of the present invention.

FIG. 4 is a perspective view of a locking device attached to a raised gangway and safety cage according to an embodiment of the present invention.

FIG. 10 is a perspective view of a locking device attached to a gangway according to an embodiment of the present invention.

DESCRIPTION OF REPRESENTATIVE EMBODIMENTS

The present invention is related to a locking device and apparatus. The locking device of the present invention is frequently used with a track mounted gangway attached to a safety cage. The locking device of the present invention preferably reduces a worker's ability to reposition the gangway and cage both intentionally and accidentally while on the upper surface of a mobile container such as a tanker truck or rail car. Thus, the locking device maintains the function of the gangway and safety cage while minimizing the number of injury and falls that occur due to incorrect repositioning of the gangway and cage. Moreover, the locking device of the present invention preferably reduces the amount of damage to the upper surface of the mobile container and/or the gangway because the gangway is not easily repositioned without adjusting the gangway and cage to the raised stored position.

Although primarily described herein in terms of its use with track mounted gangways and safety cages, it will be clear that the locking device of the present invention may also be used in connection with a variety of other devices. The invention will be described with reference to the figures forming an integral non-limiting part of the instant specification. Throughout the description, similar elements will be numbered accordingly.

Figure 1:
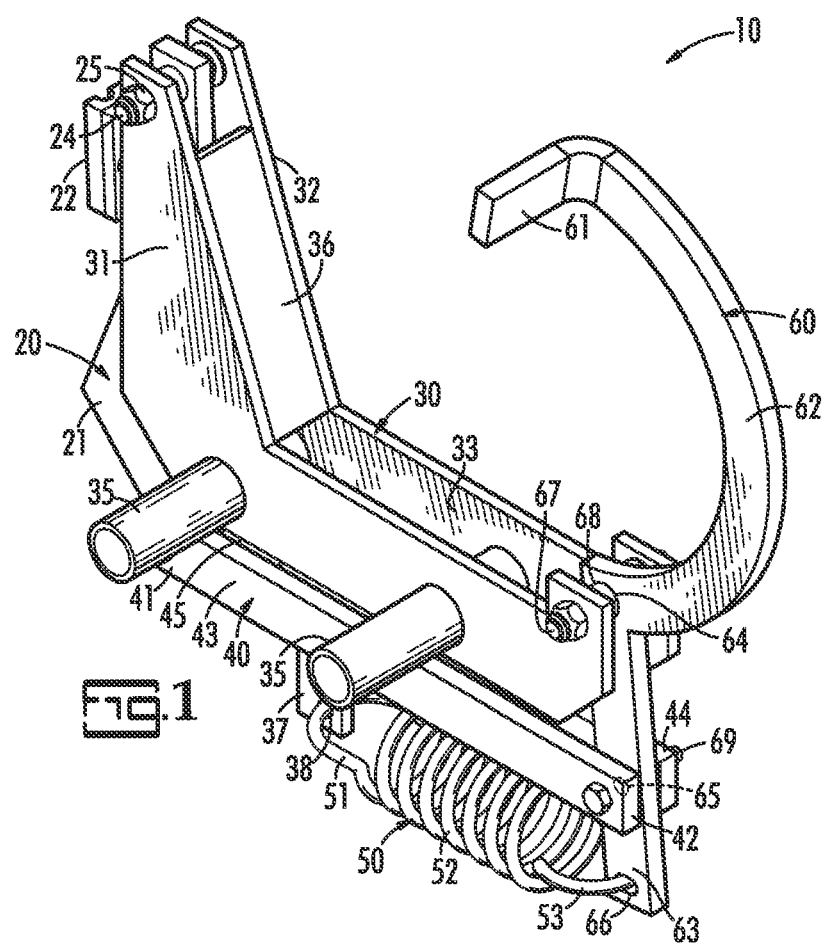
FIG. 1 is a perspective view of a locking device according to an embodiment of the present invention.

FIG. 1 represents an embodiment of the locking device 10 of the present invention. The locking device as shown in the embodiment of FIG. 1 preferably includes a brake pad pivot assembly 20, a carriage assembly 30, a connecting link 40, a spring 50, and a lever assembly 60. As shown in FIG. 2, brake pad pivot assembly 20 preferably includes a generally "Z" shaped body 21 and incorporates a friction pad 22. The brake pad pivot assembly 20 is pivotably attached preferably at its upper end to one end of carriage assembly 30 preferably by a shaft 24. In the embodiment shown in FIG. 3, the brake pad pivot assembly 20 is also pivotably attached preferably at its lower end to connecting link 40 preferably by a shaft 26.

The carriage assembly 30 is preferably generally "L" shaped and preferably includes two sides 31, 32 having a gap 33 therebetween. In the embodiment shown in FIG. 1, shaft 24 extends through side 31 of carriage assembly 30, through an opening 23 in the body 21 of brake pad pivot assembly 20, and then through side 32 of carriage assembly 30. In this embodiment, collars 25, such as nuts, secure the shaft 24 in place. Washers and/or spacers may be positioned as needed along shaft 24. Moreover, a bushing and/or bearing 27, which typically reduces dirt and debris contamination, facilitates rotation, and reduces wear, may be used to surround shaft 24 as shown in FIG. 2.

As shown in FIG. 3, carriage assembly 30 may be mounted to a tracking device such as a tracking gangway 90. In the embodiment shown, bolts 34 extend through carriage assembly 30 into gangway 90 to mount carriage assembly 30 to gangway 90. Moreover, in the embodiment shown in FIG. 1, support casings 35 are inserted through each of the sides 31, 32 of carriage assembly 30 for enclosing and supporting bolts 34. Other mounting devices and techniques, however, may be used without departing from the spirit and the scope of the invention. A plate 36 is also preferably affixed between sides 31 and 32 of carriage assembly 30 and partially covering gap 33. Plate 36 is preferably included to minimize obstruction and reduce dirt and debris contamination within the carriage assembly. Carriage assembly 30 also includes a plate 37 that remains fixed with respect to gangway 90 and carriage assembly 30 and attaches to one end of spring 50. In the embodiments shown in FIGS. 1 and 3, plate 37 is affixed within gap 33 to the support casings 35. In this embodiment, plate 37 is preferably generally "Y" shaped so that it may be secured at its upper two ends to each support casing 35 and includes an opening 38 at its lower end preferably for attachment of spring 50. In one embodiment, plate 37 is welded to support casing 35. In an alternative embodiment, plate 37 has openings so that support casings extend through plate 37.

As discussed above, brake pad pivot assembly 20 is also attached preferably at its lower end to one end 41 of connecting link 40. In the embodiment shown in FIGS. 1 and 3, connecting link 40 includes two sides 43, 44 with a gap 45 therebetween. Shaft 26 extends through side 43 of connecting link 40, through an opening 28 in the body 21 of brake pad pivot assembly 20, and then through side 44 of connecting link 40. In the embodiment shown in FIGS. 1 and 3, connecting link 40 extends below and approximately parallel with at least a portion of carriage assembly 30. Moreover, brake pad pivot assembly 20 and connecting link 40 are preferably attached at a location below carriage assembly 30.

Lever assembly 60 is preferably pivotably attached to opposing end 42 of connecting link 40 and the end of carriage assembly 30 that is not attached to brake pad pivot assembly 20. Lever assembly 60 preferably forms a generally hook shape, and in the embodiment shown in FIGS. 1 through 3, lever assembly 60 includes a tab 61, a curved portion 62, and a stem 63.

Lever assembly 60 preferably includes three openings 64, 65, and 66 for connecting to carriage assembly 30, connecting link 40, and spring 50, respectively. In the embodiment shown in FIGS. 1 through 3, openings 64, 65, and 66 are positioned in the stem portion 63 of lever assembly 60. Preferably a shaft 67 extends through side 31 of carriage assembly 30, through opening 64 of lever assembly 60, and through side 32 of carriage assembly 30. Shaft 67 is preferably secured by collars such as nuts positioned outside of carriage assembly 30. Washers and/or spacers may be positioned as needed along shaft 67. Moreover, a bushing and/or bearing 68, which typically reduces dirt and debris contamination, facilitates rotation, and reduces wear, may be used to surround shaft 67. Similarly, a shaft 69 preferably extends through side 43 of connecting link 40, through opening 65 of lever assembly 60, and through side 44 of connecting link 40. Shaft 69 is preferably secured by collars such as nuts positioned outside of connecting link 40. Like shaft 67, Washers, spacers, bearings, and/or bushings may be positioned as needed along shaft 69.

Spring 50 preferably includes a hook 51 at one end for attachment to plate 37 of carriage assembly 30 and a hook 53 at the opposing end extending through opening 66 of lever assembly 60. Spring coils 52 preferably separate hooks 51 and 53.

In the embodiment shown in FIGS. 1 through 3, the body 21 of brake pad pivot assembly 20 is preferably approximately 8¾ inches in height from opening 28 to opening 23 and approximately 10 inches in total height. Friction pad 22 is preferably approximately 2 inches in height and approximately 1½ inches in width. The end of friction pad 22 horizontally to opening 23 is preferably approximately 1½ inches. Moreover, the center of friction pad 22 is preferably approximately 7 inches above opening 28. Carriage assembly 30 is preferably approximately 8 inches in height and 11 inches in width, and each side 31, 32 is preferably approximately ¼ of an inch in depth. Shaft 24 is preferably positioned approximately 7½ inches above the bottom of carriage assembly 30 and shaft 67 is preferably positioned approximately 2¼ inches above the bottom of carriage assembly 30. Shafts 24 and 67 are preferably approximately 10 inches horizontally apart. The center of support casings 35 are preferably approximately ¾ of an inch above the bottom of carriage assembly 30 and approximately 4½ inches deep. Plate 37 is preferably approximately 5 inches wide, 4 inches high, and ¼ of an inch deep. The Y angles of plate 37 are preferably approximately 60 degrees extending from the support casing 35 positioned next to brake pad pivot assembly 20 and approximately 30 degrees extending from the opposing support casing 35. The Y stem of plate 37 is preferably approximately one inch in width and the opening for spring 50 is preferably offset approximately ⅛ of an inch towards the support casing 35 furthest from brake pad pivot assembly 20. Each side 43, 44 of connecting link 40 is preferably approximately 11 inches wide, one inch high, and ⅜ of an inch deep. Shafts 26 and 69 are each preferably positioned approximately ½ of an inch from the respective ends of connecting link 40. Lever assembly 60 is preferably approximately 13 and ⅞ inches high. The center of opening 64 is preferably approximately 5¾ inches from the bottom of lever assembly 60, the center of opening 65 is preferably approximately 2¼ inches from the bottom of lever assembly 60, and the center of opening 66 is preferably approximately ⅜ of an inch from the bottom of lever assembly 60.

As shown in FIG. 3, locking device 10 may be configured to attach to an existing gangway structure 90. To attach the embodiment of the locking device 10 shown in FIGS. 1 through 3 to gangway 90, two holes 91 are created in the base 93 of gangway 90. Support casings 35 are inserted into holes 91 and bolts 34 are inserted into support casings 35. Bolts 34 are preferably secured to base 93 of gangway 90 by securing devices such as nuts 92. Alternatively, locking device 10 is formed as an integral apparatus with a new gangway structure. Other devices and techniques may be used for attaching the embodiments of the locking device of the present invention to a device such as a gangway without departing from the spirit and the scope of the present invention.

Figure 5:
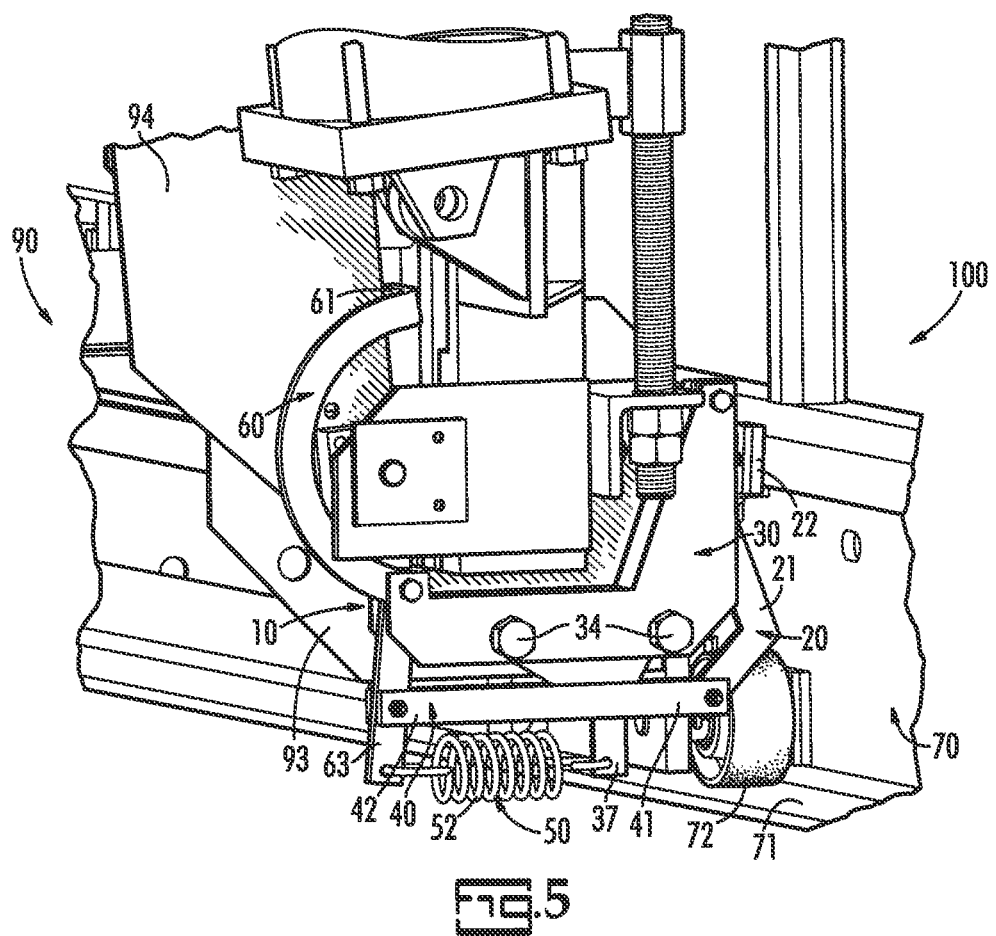
FIG. 5 is a close-up perspective view from FIG. 4 of a locking device attached to a raised gangway and safety cage according to an embodiment of the present invention.
Figure 6:
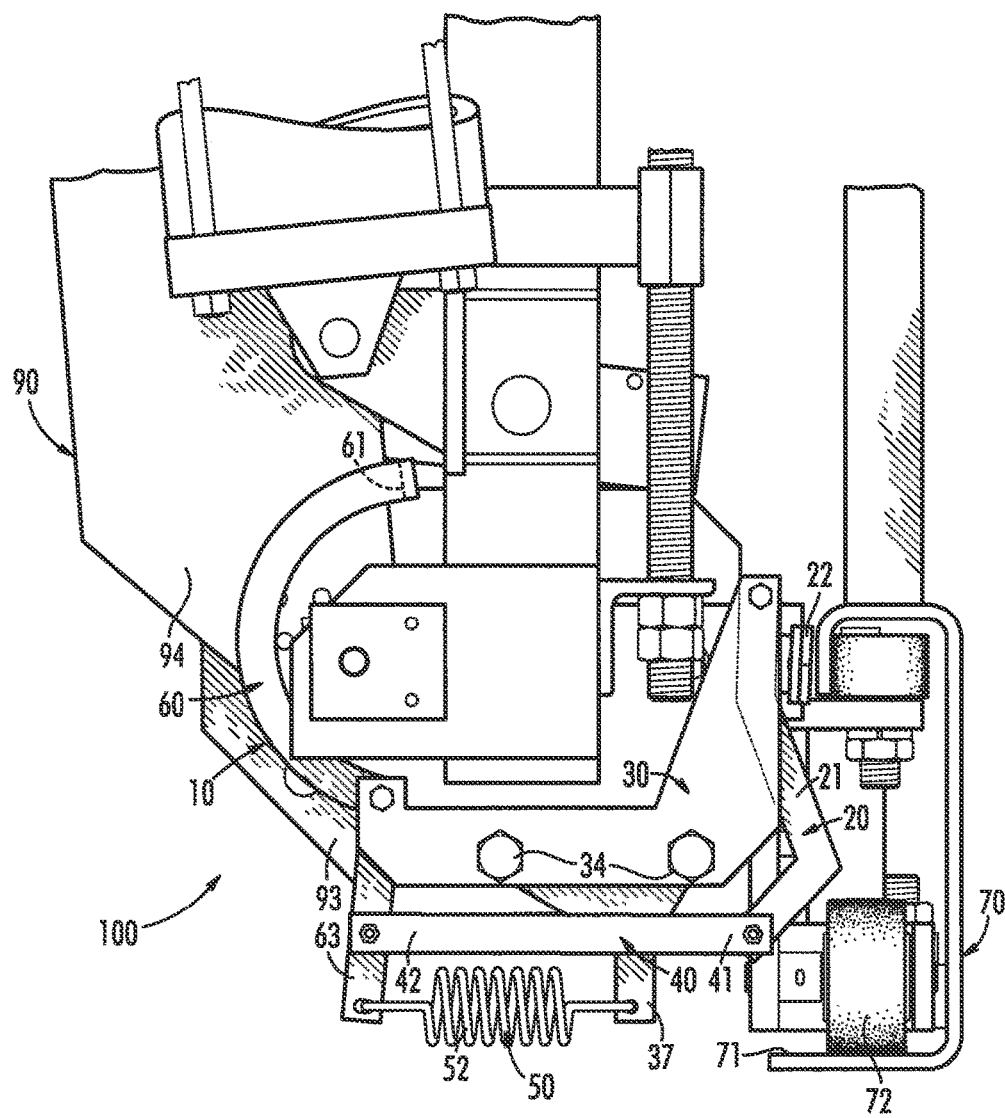
FIG. 6 is a close-up side view from FIG. 4 of a locking device attached to a raised gangway and safety cage according to an embodiment of the present invention.

FIGS. 4 through 6 illustrate an embodiment of the locking device 10 when the gangway 90 and cage 80 are in the raised stored position. In this embodiment, gangway 90 is attached to a track face 70 of a service platform. Preferably base 93 of gangway 90 moves along track 71 of track face 70 in the lateral direction preferably by rollers 72 as shown in more detail at 100 in FIGS. 5 and 6. Carriage assembly 30 is preferably bolted to base 93 of gangway 90 and thus, carriage assembly 30, including plate 37, preferably remain static with respect to the base 93 of gangway 90. When gangway 90 is raised, tab 61 preferably becomes hooked on stringer 94 of gangway 90 causing it to move towards track face 70. When tab 61 of lever assembly 60 moves towards track face 70, the stem 63 of lever assembly 60 preferably moves away from track face 70. This movement of stem 63 then preferably causes increased tension in spring 50, which also preferably causes coils 52 to expand, and connecting link 40 to also preferably move away from track face 70. End 41 of connecting link 40 is preferably attached to brake pad pivot assembly 20 at opening 28. The movement by connecting link 40 away from track face 70 causes the lower end of brake pad pivot assembly 20 to also move away from track face 70. Because of the configuration of brake pad pivot assembly 20 and its attachment to carriage assembly 30, friction pad 22 of brake pad pivot assembly 20 preferably pivots away from track face 70 and the pressure on track face 70 caused by friction pad 22 is reduced. Because the pressure between track face 70 and friction pad 22 is reduced, gangway 90 can be repositioned to the desired location along track 71 of track face 70 when the gangway 90 is in the raised stored position.

Figure 7:
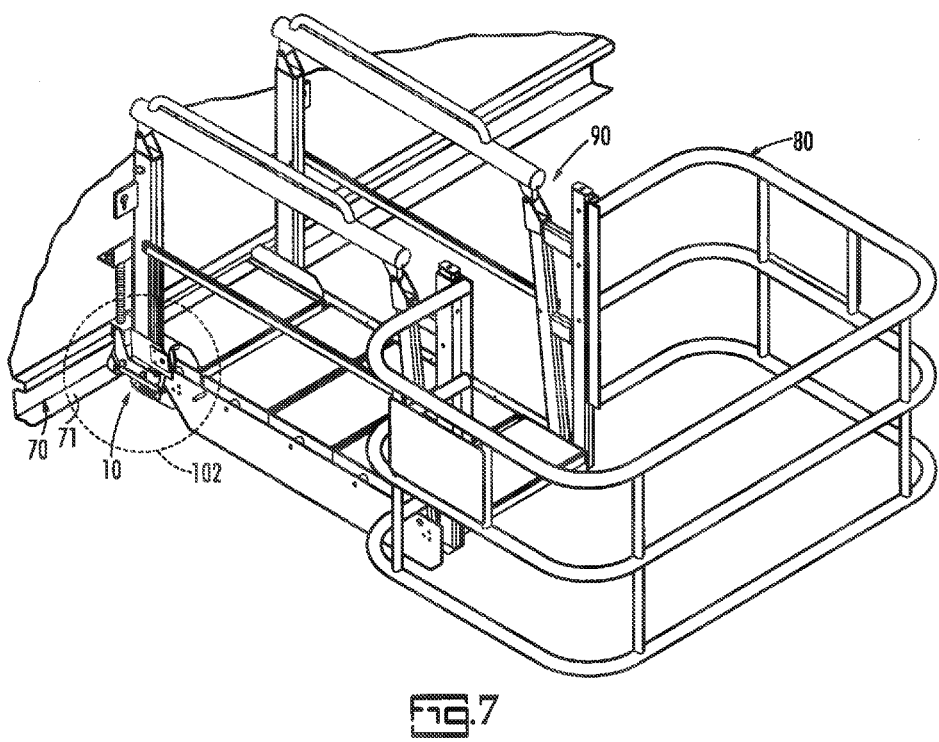
FIG. 7 is a perspective view of a locking device attached to a lowered gangway and safety cage according to an embodiment of the present invention.
Figure 8:
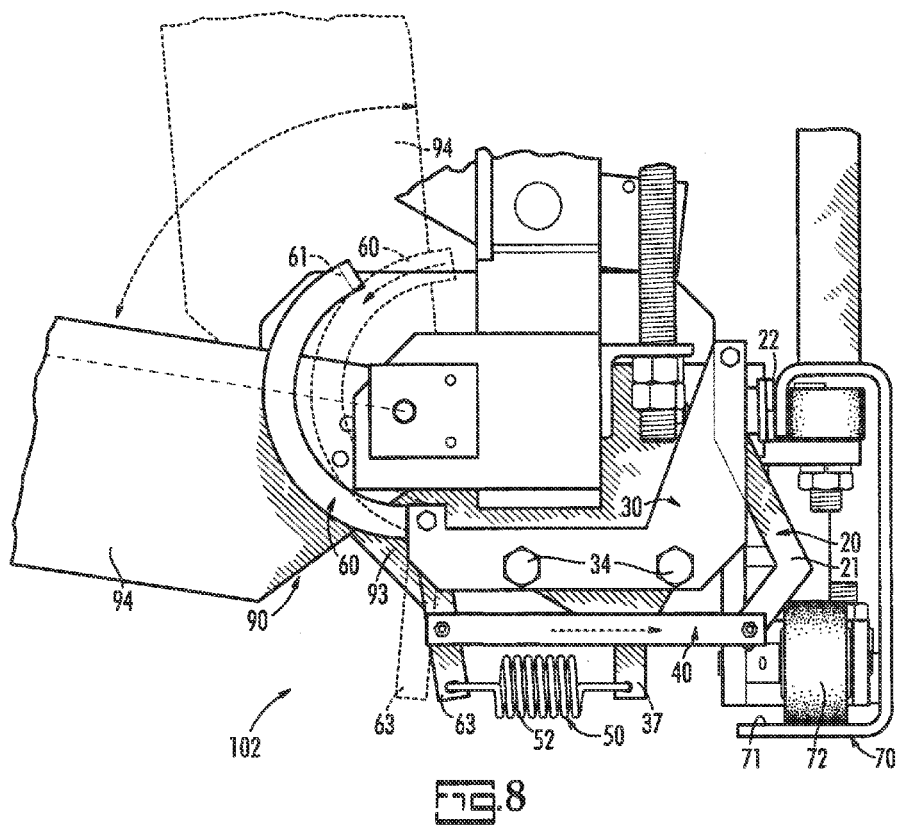
FIG. 8 is a close-up side view from FIG. 7 of a locking device attached to a lowered gangway and safety cage according to an embodiment of the present invention.

FIGS. 7 and 8 illustrate an embodiment of the locking device 10 when the gangway 90 and cage 80 are in the lowered access position. In this embodiment, carriage assembly 30, including plate 37, are static with respect to the base 93 of gangway 90. As shown in more detail at 102 in FIG. 8, when gangway 90 is lowered, the internal tension in spring 50 preferably pivotally moves stem 63 of lever assembly 60 towards track face 70, thereby preferably pivotally moving tab 61 of lever assembly 60 away from track face 70. Connecting link 40 also preferably moves towards track face 70. The movement of connecting link 40 towards track face 70 causes the lower end of brake pad pivot assembly 20 to also move towards track face 70 and friction pad 22 of brake pad pivot assembly 20 preferably also pivots towards track face 70. The pressure on track face 70 caused by friction pad 22 is then increased so it becomes difficult to reposition gangway 90 along track 71 of track face 70 when the gangway 90 is in the lowered access position. As stringer 94 continues downward rotation, the pressure of friction pad 22, via connecting link 40 and spring 50, prevents lever assembly 60 from moving further and stringer 94 moves pivotally away from tab 61 of lever 60.

Figure 9:
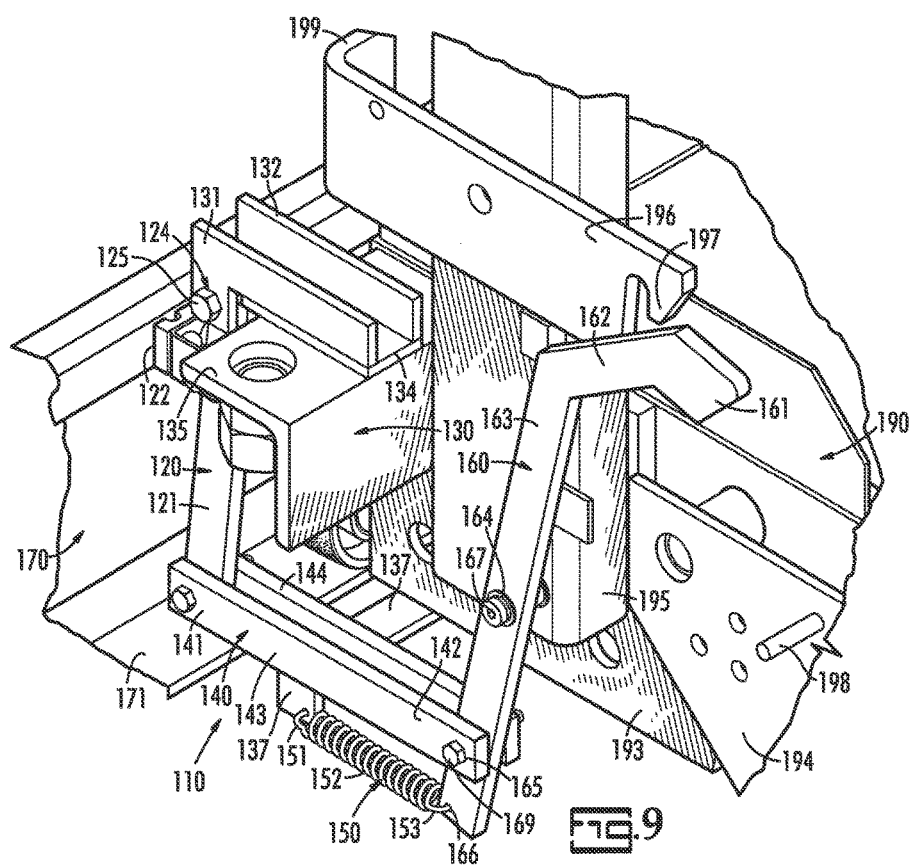
FIG. 9 is a perspective view of a locking device attached to a gangway that is attached to a track surface according to an embodiment of the present invention.

FIGS. 9 and 10 illustrate an alternative embodiment of the locking device of the present invention attached to a gangway device in the lowered access position. Similar to locking device 10, the locking device 110 includes a brake pad pivot assembly 120, a carriage assembly 130, a connecting link 140, a spring 150, and a lever assembly 160. As more specifically discuss below, the embodiment shown in FIGS. 9 and 10 primarily differs from the embodiment of FIGS. 1 through 3 because lever assembly 160 is directly attached to gangway 190.

The brake pad pivot assembly 120 shown in FIGS. 9 and 10 preferably includes a generally rectangularly shaped body 121 and incorporates a friction pad 122. The brake pad pivot assembly 120 is pivotably attached preferably at its upper end to one end of carriage assembly 130 preferably by a shaft 124 and is also pivotably attached preferably at its lower end to connecting link 140 preferably by a shaft 126 as shown in FIG. 10.

The carriage assembly 130 is rigidly mounted to the base 193 of a gangway 190 and preferably includes a body 135 and sides 131, 132 having a gap 133 therebetween for attachment of brake pad pivot assembly 120 by shaft 124. In this embodiment, collars 125, such as nuts, secure the shaft 124 in place on each of sides 131 and 132 of carriage assembly 130. In the embodiment shown in FIGS. 9 and 10, sides 131 and 132 are preferably removably affixed to carriage assembly 130 by bolts (not shown) extending through a common side 134 and body 135 of carriage assembly 130.

Carriage assembly 130 also preferably includes a plate 137 that is also rigidly mounted to the base 193 of gangway 190. In the embodiment shown in FIGS. 9 and 10, plate 137 is not directly connected to the remainder of carriage assembly 130 except through gangway base 193. In an alternative embodiment similar to FIGS. 9 and 10, plate 137 is directly attached to the remainder of carriage assembly 130. The plate 137 shown in FIGS. 9 and 10 is generally "T" shaped and has its lower end attached to spring 150 while its upper opposing end is positioned within connecting link 140.

Like connecting link 40, connecting link 140 preferably includes two sides 143, 144 with a gap 145 therebetween. End 141 of connecting link 140 is preferably pivotably attached to brake pad pivot assembly 120 by shaft 126 that extends through side 143 of connecting link 140, through an opening in the body 121 of brake pad pivot assembly 120, and then through side 144 of connecting link 140. In the embodiment shown in FIGS. 9 and 10, connecting link 140 extends below and approximately parallel with sides 131, 132 of carriage assembly 130. The opposing end 142 of connecting link 140 is pivotably attached to lever assembly 160 preferably by a shaft 169 that preferably extends through side 143 of connecting link 140, through opening 165 of lever assembly 160, and through side 144 of connecting link 140. Shaft 169 is preferably secured by collars such as nuts positioned outside of connecting link 140.

Lever assembly 160, as shown in the embodiment of FIGS. 9 and 10, includes a tab 161, an angled portion 162, and a stem 163. In this embodiment, three openings 164, 165, and 166 on the stem 163 of lever assembly 160 connect to gangway 190, connecting link 140, and spring 150, respectively. In the embodiment shown in FIGS. 9 and 10, shaft 167 connects the lever assembly 160 to gangway 190 by extending through opening 164 of lever assembly 160 and into a rail 195 rigidly affixed to the base 193 of gangway 190. Alternatively, shaft 167 extends through opening 164 of lever assembly 160 and directly into the base 193 of gangway 190. Shaft 167 is preferably secured by collars such as nuts positioned adjoining lever assembly 160 and gangway 190. Shaft 169 preferably connects the lever assembly to connecting link 140 by extending through side 143 of connecting link 140, through opening 165 of lever assembly 160, and through side 144 of connecting link 140. Shaft 169 is preferably secured by collars such as nuts positioned adjoining connecting link 140.

Spring 150 preferably includes a hook 151 at one end for attachment to plate 137 of carriage assembly 130 and a hook 153 at the opposing end extending through opening 166 of lever assembly 160. Spring coils 152 preferably extend between hooks 151 and 153.

Similar to the embodiment shown in FIGS. 1 through 3, washers and/or spacers may be positioned as needed along shafts 124, 126, 167, and 169 of the embodiment shown in FIGS. 9 and 10. Moreover, bushings and/or bearings, which typically reduce dirt and debris contamination, facilitate rotation, and reduce wear, may be used to surround any or all of shafts 124, 126, 167, and 169.

Like the embodiments shown in FIGS. 1 through 3, locking device 110 of FIGS. 9 and 10, may be configured to attach to an existing gangway structure or may be formed as an integral apparatus with a gangway structure. Moreover, gangway 190 preferably includes a foot lock 196 having a hook 197 that is preferably pivotably attached to gangway 190. Stringer 194 of gangway 190 preferably includes a pin 198. When gangway 190 is raised to the stored position, pin 198 catches lever assembly tab 161 and hook 197 and tab 161 moves towards track face 170. When tab 161 of lever assembly 160 moves towards track face 170, the stem 163 of lever assembly 160 preferably moves away from track face 170. This movement of stem 163 then preferably causes increased tension in spring 150, which also preferably causes coils 152 to expand, and connecting link 140 to also preferably move away from track face 170. The movement by connecting link 140 away from track face 170 causes the lower end of brake pad pivot assembly 120 to also move away from track face 170. Because of the configuration of brake pad pivot assembly 120 and its attachment to carriage assembly 130, friction pad 122 of brake pad pivot assembly 120 preferably pivots away from track face 170 and the pressure on track face 170 caused by friction pad 122 is reduced. Because the pressure between track face 170 and friction pad 122 is reduced, gangway 190 can preferably be repositioned to the desired location along track 171 of track face 170 when the gangway 190 is in the raised stored position.

Once gangway 190 has been relocated to the preferred position, end 199 of foot lock 196 is preferably pressed downward preferably causing the pin 198 to release from hook 197 and the gangway to lower to the lowered access position. When gangway 190 is lowered, the internal tension in spring 150 preferably pivotally moves stem 163 of lever assembly 160 towards track face 170, thereby preferably pivotally moving tab 161 of lever assembly 160 away from track face 170. Connecting link 140 also preferably moves towards track face 170. The movement of connecting link 140 towards track face 170 causes the lower end of brake pad pivot assembly 120 to also move towards track face 170 and friction pad 122 of brake pad pivot assembly 120 preferably also pivots towards track face 170. The pressure on track face 170 caused by friction pad 122 is then increased so it becomes difficult to reposition gangway 190 along track 171 of track face 170 when the gangway 190 is in the lowered access position. As stringer 194 continues downward rotation, the pressure of friction pad 122, via connecting link 140 and spring 150, prevents lever assembly 160 from moving further and stringer 194 moves pivotally away from tab 161 of lever 160.

In yet another alternative embodiment not shown in the figures, brake pad pivot assembly, carriage assembly, connecting link, spring, and lever assembly have a reverse configuration to the previously disclosed embodiments. Specifically, the configuration of brake pad pivot assembly and the location of the friction pad along the brake pad pivot assembly may be altered so that the friction pad extends further towards the track face when the tab of the lever assembly moves towards the track face and the spring expands. The gangway cannot be easily repositioned along the track face because of the pressure from the friction pad. So that the pressure is increased while the gangway is in the lowered access position, the lever assembly is preferably adjusted by devices such as actuators or the lever assembly is adjusted to catch the stringer of the gangway when it lowers instead of when it raises.

It should be noted that there are several configurations suitable for the design of the locking device of the present invention, and the shapes, sizes, and dimensions of the parts of the locking device discussed above are for example only and represent but one of the configurations of the locking device. Other configurations altering the number of parts, attachment positions of the parts, means for attaching and securing the parts, and shapes, sizes, and dimensions of the parts could be employed to demonstrate the invention and are intended to be encompassed by the present invention. The description and drawings should not be deemed to narrow the scope of the present invention in any way.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that the figures, which highlight the functionality and advantages of the present invention, are presented for purposes of example only. The architecture of the present invention is sufficiently flexible and configurable, such that it may be used in ways other than that shown in the accompanying figures.

Further, the purpose of the Abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

What is claimed is:

1. A locking apparatus comprising:
   a safety cage capable of being raised and lowered, said safety cage movable along a track surface and comprising a locking device, said locking device comprising,
   a connecting link having a first portion and an opposing second portion,
   a lever assembly pivotably attached to said connecting link at said first portion,
   a pivot assembly pivotably attached to said connecting link at said opposing second portion,
   a friction pad on said pivot assembly, a carriage assembly mounted to said safety cage, said pivot assembly pivotably attached to said carriage assembly, and a spring having a first end and an opposing second end, said spring attached to said lever assembly at said first end and mounted to said safety cage at said second end, whereby as said safety cage is lowered, said friction pad applies pressure on said track surface reducing mobility between said safety cage and said track surface.

2. The apparatus of claim 1 wherein when said safety cage is raised, pressure is reduced between said friction pad and said track surface and moveability of said safety cage along said track surface is increased.

3. The apparatus of claim 1 wherein when said safety cage is lowered, said spring contracts.

4. The apparatus of claim 1 wherein said safety cage comprises a body and a stringer, said stringer is capable of being raised and lowered.

5. The apparatus of claim 4 wherein when said safety cage is raised, said stringer connects with an upper segment of said lever assembly causing said upper segment to move toward said track surface and a lower segment of said lever assembly to move away from said track surface, said movement of said lower segment of said lever assembly away from said track surface causes said connecting link to move away from said track surface and said friction pad of said pivot assembly to move away from said track surface, said pressure between said friction pad and said track surface is reduced.

6. The apparatus of claim 5 wherein when said safety cage is lowered, said stringer disconnects with said upper segment of said lever assembly and said spring causes said upper segment of said lever assembly to move away from said track surface, the lower segment of said lever assembly to move toward said track surface, said connecting link to move toward said track surface, and said friction pad of said pivot assembly to move toward said track surface, said pressure between said friction pad and said track surface is increased.

7. A locking apparatus, said apparatus comprising:

a connecting link having a first portion and an opposing second portion;

a lever assembly pivotably attached to said connecting link at said first portion;

a pivot assembly pivotably attached to said connecting link at said opposing second portion, said pivot assembly having a friction pad;

a carriage assembly adaptable for mounting to a track mounted device, said pivot assembly pivotably attached to said carriage assembly; and a spring having a first end and an opposing second end, said spring attached to said lever assembly at said first end and adaptable for mounting to said track mounted device at said second end.

8. The apparatus of claim 7 wherein said carriage assembly and said spring are mounted to said track mounted device, said track mounted device being moveable along a track surface.

9. The apparatus of claim 8 wherein when said spring contracts, moveability by said track mounted device along said track surface is reduced.

10. The apparatus of claim 9 wherein when said spring expands, moveability by said track mounted device along said track surface is increased.

11. The apparatus of claim 7 wherein said spring is mountable to said track mounted device by said carriage assembly.

12. The apparatus of claim 11 wherein said carriage assembly comprises a plate, said spring is mountable to said track mounted device by said plate.

13. The apparatus of claim 7 wherein said spring is mountable to said track mounted device by a plate attached to said track mounted device.

14. The apparatus of claim 7 wherein said lever assembly is pivotably attached to said connecting link by a shaft.

15. The apparatus of claim 14 wherein said connecting link comprises a first side and a second side, said shaft extends through said first side of said connecting link, through said lever assembly, and through said second side of said connecting link.

16. The apparatus of claim 7 wherein said pivot assembly is pivotably attached to said connecting link by a shaft.

17. The apparatus of claim 16 wherein said connecting link comprises a first side and a second side, said shaft extends through said first side of said connecting link, through said pivot assembly, and through said second side of said connecting link.

18. The apparatus of claim 7 wherein said pivot assembly is pivotably attached to said carriage assembly by a shaft.

19. The apparatus of claim 18 wherein said carriage assembly comprises a first side and a second side, said shaft extends through said first side of said carriage assembly, through said pivot assembly, and through said second side of said carriage assembly.

20. The apparatus of claim 7 wherein said lever assembly is mountable to said track mounted device by said carriage assembly.

* * * * *